(12) United States Patent　　(10) Patent No.: US 6,371,466 B1
Spears　　(45) Date of Patent: Apr. 16, 2002

(54) OVERLOAD SUPPORT APPARATUS FOR LEAF SPRING SUSPENSION SYSTEMS

(76) Inventor: Lonnie K. Spears, 2716 W. Eppler Dr., Durant, OK (US) 74701

( * ) Notice: Subject to any disclaimer, the term of this patent is extended or adjusted under 35 U.S.C. 154(b) by 0 days.

(21) Appl. No.: 09/838,647

(22) Filed: Apr. 19, 2001

(51) Int. Cl.$^7$ .......................... B60G 11/10; B60G 17/00
(52) U.S. Cl. ...................... 267/265; 267/30; 280/6.157; 280/124.104; 280/6.159
(58) Field of Search .......................... 267/36, 259, 265; 280/6.157, 6.159, 124.102, 124.104, 124.17, 124.175

(56) References Cited

U.S. PATENT DOCUMENTS

| | | |
|---|---|---|
| 3,462,169 A | 8/1969 | Carter |
| 3,572,749 A | 3/1971 | Yew et al. |
| 3,799,571 A | 3/1974 | Sudberry |
| 3,850,444 A | 11/1974 | Wright et al. |
| 4,671,535 A | 6/1987 | Hanson et al. |
| 4,796,910 A | 1/1989 | Starr, Sr. |
| 4,927,173 A | 5/1990 | Clifton, Jr. |
| 5,172,930 A | 12/1992 | Boye et al. |

*Primary Examiner*—Christopher P. Schwartz
(74) *Attorney, Agent, or Firm*—Robert H. Frantz; Robert W. Brown (57) ABSTRACT

An apparatus for mounting to a truck suspension system which provides reinforcement to standard leaf spring suspensions in a manner that is adjustable and flexible. It provides improved weight distribution while allowing for additional vertical travel of the suspension system during periods of extreme shock loading. The apparatus mounts to the vehicle frame at a location behind the rear axle between the rear axle and rear attachment point of the leaf spring. The apparatus is both vertically and horizontally adjustable and provides an adjustable amount of reinforcement, thus allowing the operator the match the amount of reinforcement to the load. The apparatus can be fully disengaged after installation and selectively used thereafter without requiring removal and subsequent reinstallation. In the disengaged position, the apparatus has no effect on the suspension system of the host vehicle.

11 Claims, 10 Drawing Sheets

OVERLOAD SUPPORT APPARATUS FOR LEAF SPRING SUSPENSION SYSTEMS

TECHNICAL FIELD OF THE INVENTION

This invention relates to the field of vehicle suspension systems and to the augmentation of vehicle suspension systems to enable heavy loading. Specifically, this invention relates to a new and useful attachment which provides for adjustable fortification of standard leaf spring suspension systems for heavy loading applications.

CROSS-REFERENCE TO RELATED APPLICATIONS

Not applicable.

FEDERALLY SPONSORED RESEARCH AND DEVELOPMENT STATEMENT

This invention was not developed in conjunction with any Federally sponsored contract.

MICROFICHE APPENDIX

Not applicable.

BACKGROUND OF THE INVENTION

The use of work vehicles continues to increase as best evidenced by continuing growth of pickup truck sales each year. Despite the continuing urbanization of America, the use of work vehicles commonly associated with rural populations continues to increase. Annual sales of half, three quarter, and one ton pickup trucks has never been higher. Pickup trucks are now commonly used in roles once reserved for passenger vehicles, ie., taking kids to school, going to the grocery store, driving to and from work, etc. However, these same "urbanized" work vehicles will often be used for the occasional work task and will be subjected to periodic heavy loading, often exceeding the design limits of the vehicle.

Since 1988 and the advent of "sport utility vehicles" (SUV), many car and truck manufacturers have used the same frame and suspension systems for their SUV's as used in their light and heavy duty pickup trucks. In many cases, the main difference between an SUV and a corresponding pickup truck is the body and interior trim. SUV's have become popular family vehicles, serving as a means to transport family members to work and school during the week, and serving as a hauling vehicle during the weekends for home projects. Additionally, some "mini-vans" are based upon a truck frame and suspension system, as well.

For the remainder of this disclosure, the term "pickup truck" or "truck" will be used to collectively refer to all vehicles based upon a pickup truck chassis.

As thoroughly described in the references included herein, an overloaded pickup truck whether carrying the load in the bed or on a trailer, will tend to drop in the rear and rise in the front. This indicates a drastically uneven weight distribution wherein the rear wheels carry most of the load, thus potentially compromising the driving characteristics, handling, and even safety of the vehicle.

U.S. Pat. No. 4,671,535 to Hanson, et al. shows an overload mechanism that includes and abutment structure rigidly mounted to the vehicle frame that, when engaged, contacts the leaf spring in a fixed location. This not only limits the travel of the leaf spring, but also acts to redistribute more of the load to the front wheels.

U.S. Pat. No. 5,172,930 to Boye et al. shows an overload mechanism basically very similar to that disclosed in the Hanson patent except the Boye apparatus is remotely engageable. This mechanism also limits the travel of the rear leaf springs and further acts to redistribute more of the load to the front wheels.

There are known devices which mount to a vehicle frame and engage the rear leaf springs in a fixed position. Each of the above referenced patents disclose abutment mechanisms that are relatively simple, mount between the rear axle and rear bumper, and provide improved weight distribution during overload conditions by effectively lengthening the vehicle wheelbase. The known devices also share the common shortfall that each is effectively non-adjustable. Once it is mounted to the frame, it will always contact the leaf spring in the same location, thereby providing a fixed limit to leaf spring travel. These mechanisms effectively provide a fixed amount of reinforcement.

The magnitude to which a vehicle is overloaded will likely vary greatly from load to load-such that one level of reinforcement is not adequate under many real loading conditions. For example, a vehicle used to pull a trailer one weekend might well be used to haul bags of cement the following weekend, then bales of hay the next. In another example, the inventor's recently issued U.S. Pat. No. 6,148,928 discloses a three point hitch system for mounting to and use with a pick up truck. Loadings applied during the use of this device will vary from application to application, thus the amount of suspension reinforcement needed will vary accordingly.

Therefor, there exits a need for a device which provides an adjustable amount of reinforcement for the rear suspension of Pickup trucks, SUV's and minivans. Additionally, there exists a need in the art for this system to be reliable, easily adjustable, and cost effective for mass production.

SUMMARY OF THE INVENTION

The system and method of the invention provide an apparatus that, when mounted to a vehicle frame and properly engaged, provides reinforcement to standard leaf spring suspension in a manner that is easily adjustable, and flexible, not rigid, thus providing both improved weight distribution while allowing for additional vertical travel of the suspension system during periods of extreme shock loading such as when an overloaded vehicle might pass over a large pot hole.

The apparatus mounts to the vehicle frame at a location behind the rear axle between the rear axle and rear attachment point of the leaf spring. The apparatus is both vertically and horizontally adjustable and provides an adjustable amount of reinforcement, thus allowing the operator the match the amount of reinforcement to the load.

BRIEF DESCRIPTION OF THE DRAWINGS

The figures presented herein when taken in conjunction with the disclosure form a complete description of the invention.

DETAILED DESCRIPTION OF THE INVENTION

For purposes of description herein, the terms "front," "side," "top," "rear," "horizontal," "vertical," "fore," "aft" and derivatives thereof shall relate to the invention as oriented in FIG. 4, thus the directive terms included above describe the views with respect to the host vehicle. Also, the terms frame and chassis are used interchangeably with respect to the host vehicle.

The overload support apparatus described herein is designed for use with a work vehicle, typically a pickup truck, and attaches to the frame aft of the rear axle. It is further designed to engage the upper surface of a leaf spring assembly wherein the point of engagement is adjustable.

Figure 1:
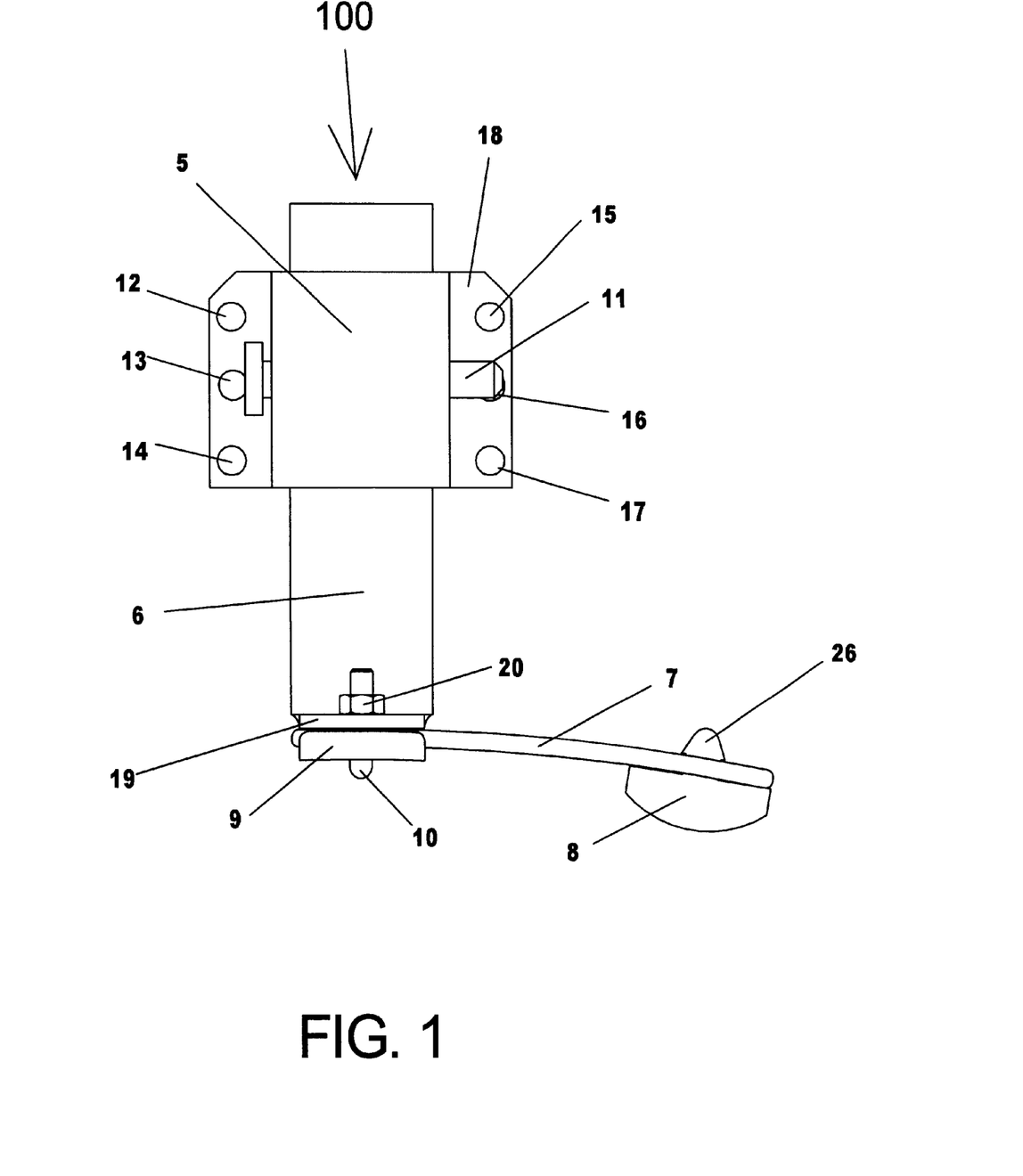
FIG. 1 shows a side view of the preferred embodiment of the leaf spring overload support apparatus disclosed herein.

Referring first to FIG. 1, the apparatus (100) is basically composed of mounting frame (18), fixed column member (5), adjustable column member (6), hitch pin (11), adjustable leaf (7), U-bolt (10), nuts (20) (21 not shown), upper plate (19), lower plate (9), and abutment pad (8). Mounting frame (18) is to be rigidly attached to the frame of a host vehicle by bolts placed through mounting holes (12–17). Mounting frame (18) includes six holes in order provide a likely match with at least three pre-existing holes per chassis member of the host vehicle. It is recommended that the apparatus (100) be firmly bolted to the chassis member by at least three bolts. Alternatively, mounting-frame (18) can be attached by continuous or spot welding or by rivets. If mounting by bolts, and holes in the chassis member do not exist, drilling will be necessary.

Spacers may be required for placement between mounting frame (18) and the frame of host vehicle to insure the overall apparatus is located directly over the leaf spring of host vehicle. Adjustable leaf (7) is held in a fixed position by U-bolt (10) which is further placed through concentrically located holes in upper plate (19) and lower plate (9).

As nuts (20, 21) on U-bolt (10) are tightened, upper and lower plates-(19) and (9) respectively are compressed about adjustable leaf (7) thereby clamping and holding adjustable leaf (7) in a substantially fixed position. After loosening nuts (20, 21), adjustable leaf (7) can slide to the left or right thus effectively increasing or decreasing the available length.

Adjustable leaf (7), which is effectively a short leaf spring member, provides for limited vertical travel under heavy loading further providing a non-rigid contact between the overall support apparatus (100) and the leaf spring of host vehicle.

Upon extreme loading conditions such as a acute shock loads, the end of adjustable leaf (7) will yield and be deflected upward thereby dampening vertical displacement. As the effective length of adjustable leaf (7) is shortened, -ie., it is moved to the left in FIG. 1, the potential for vertical displacement of the end attached to abutment pad (8) is reduced thereby reducing the potential for dampening vertical displacement.

In a preferred embodiment, abutment pad (8) is made of a resilient material such as vulcanized rubber, Teflon(TM), or a variety of polymer-based compounds, and is attached to adjustable leaf (7) by a protruding finger portion (26) of abutment pad (8) inserted through a rectangular hole (25, not shown) in adjustable leaf (7).

Figure 3:
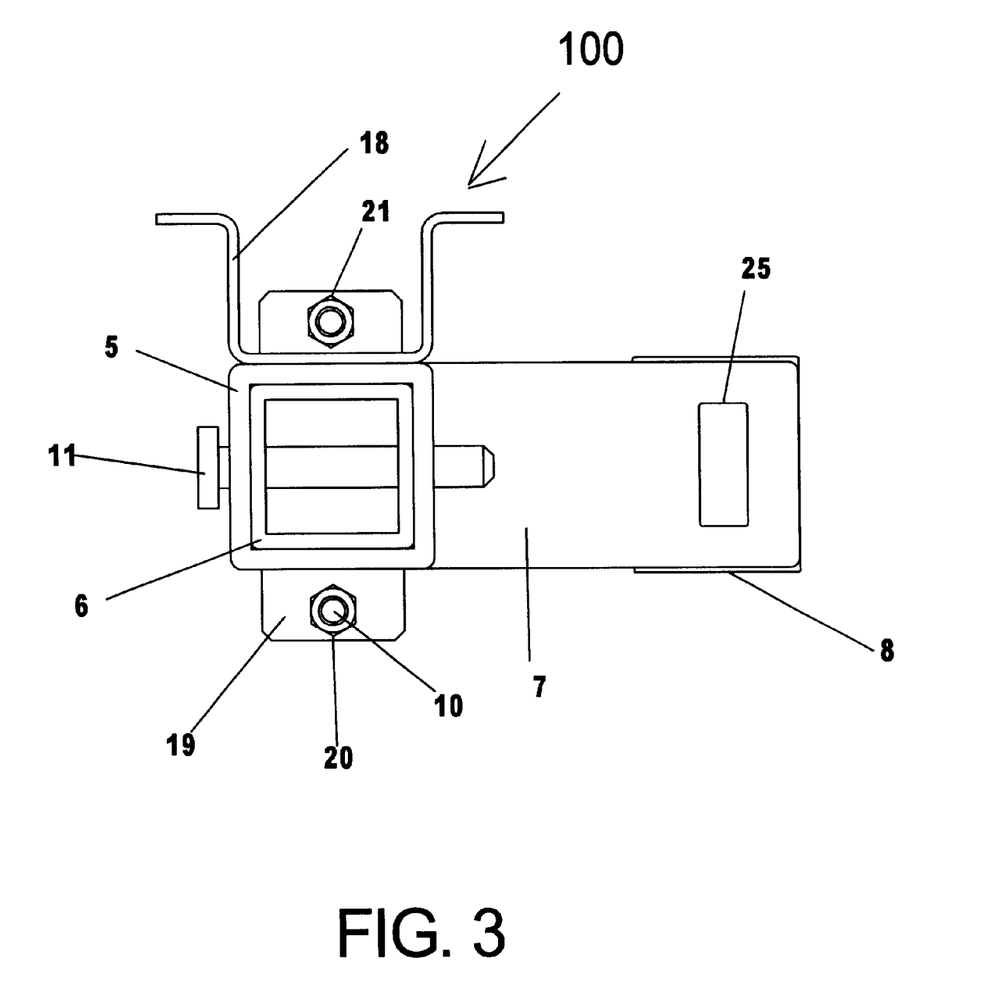
FIG. 3 shows a top view of the preferred embodiment.

Referring to FIG. 3, it is shown that fixed column member (5) has a substantially square vertical channel there through and adjustable column member (6), having a substantially square horizontal cross section, is slidably disposed therein. This drawing illustrates a preferred embodiment. However, the vertical opening in fixed column member (5) and the cross section of adjustable column member (6) need not be substantially square, but it is advisable that they both be substantially the same to insure a reasonably secure fit.

FIG. 3 illustrates hitch pin (11) placed through both fixed column-member (5) and adjustable column member (6) each having concentric holes sized to allow easy insertion and removal of hitch pin (11). Once inserted, hitch pin (11) may be held in place by a fastening means such as a cotter pin.

FIG. 3 further shows nuts (20, 21) fixed about U-bolt (10) above upper plate (19).

Figure 2:
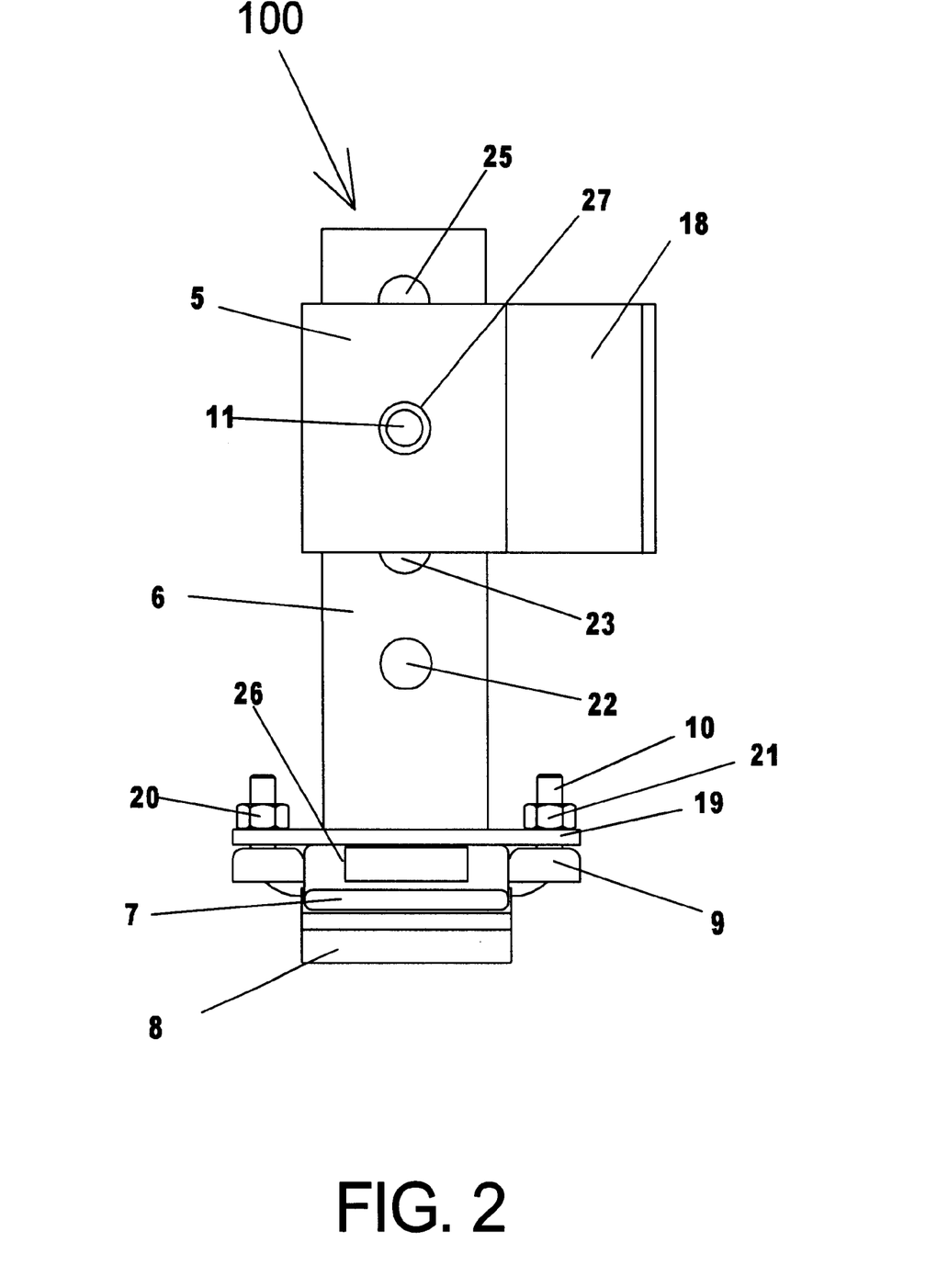
FIG. 2 shows a rear view of the preferred embodiment.

Referring now to FIG. 2 which shows a rear view of subject apparatus, it can be seen that adjustable column (6) has a plurality of horizontal holes (22–25) drilled there through (corresponding holes 22'–25' not shown).

Fixed column member (5) has a set of holes (27/27') which align concentrically with said holes (22–25) and (22'–25') as adjustable column member (6) is moved up or down within fixed column member (5). The alignment of holes (27/27') with either sets of holes (22/22, 23/23', 24/24', or 25/25') allow the insertion of hitch pin (11) thereby fixing the vertical position of adjustable column member (6). These holes allow the vertical position of adjustable column (6) to be fixed in one of several available different positions. Four optional positions are provided in the preferred embodiment. As stated above, hitch pin (11) can be held in position by a cotter pin or other comparable attachment means.

Also according to the preferred embodiment and illustrated in FIG. 2, the mounting frame (18) is attached to fixed column member (5). The attachment means can be any that provides a rigid attachment of sufficient strength such a continuous weld around the perimeter of the interface. Likewise, upper plate (19) is substantially perpendicular with and rigidly attached to the lower end of adjustable column (6). The attachment means can be any that provides a rigid attachment of sufficient strength such as a continuous weld.

FIGS. 4a, 4b, 4c, and 4d show four typical installation configurations. In each installed configuration, the overall assembly (100) is located between the axle assembly (30) and rear mounting point of leaf spring assembly (29), and mounting frame (18) is attached to chassis member (28) aft of axle housing assembly (30).

Figure 4A:
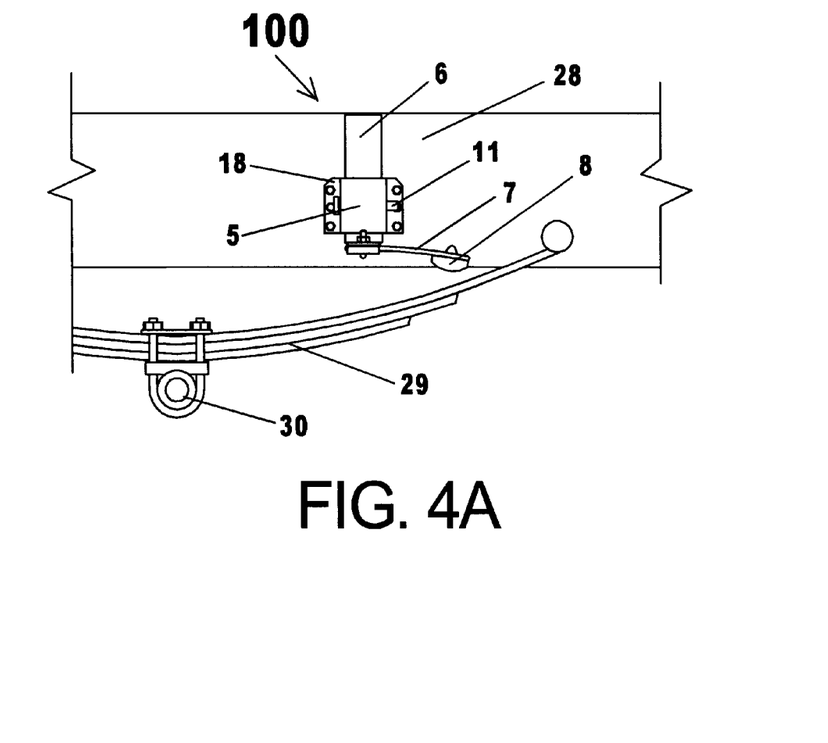
FIG. 4 shows side views of the preferred embodiment in four different installed configurations.

FIG. 4a shows an installed but disengaged configuration wherein mounting frame (18) is attached to vehicle chassis member (28), adjustable column member (6) is raised to the top position with hitch pin (11) inserted through holes (22/22') in adjustable column member (6) and holes (27/27') in fixed column member (5). Adjustable leaf (7) is in a fully extended position, but abutment pad (8) does not engage the leaf spring assembly (29) of host vehicle.

Figure 4B:
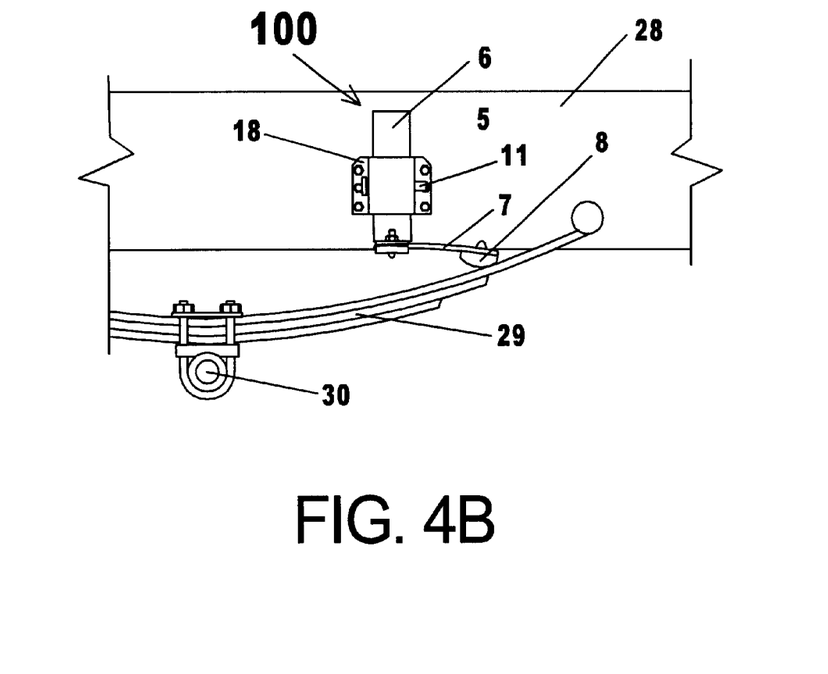

FIG. 4b shows an installed configuration wherein mounting frame (18) is attached to vehicle chassis member (28), hitch pin (11) is placed through holes (23/23') in adjustable column member (6) and holes (27/27') in fixed column member (5), adjustable leaf (7) is in a fully extended position, and abutment pad (8) is in firm contact with leaf spring assembly (29). This configuration will provide limited augmentation of the suspension system, maximum dampening of shock loads, and is recommended when only limited augmentation is required, ie., light loading.

Figure 4C:
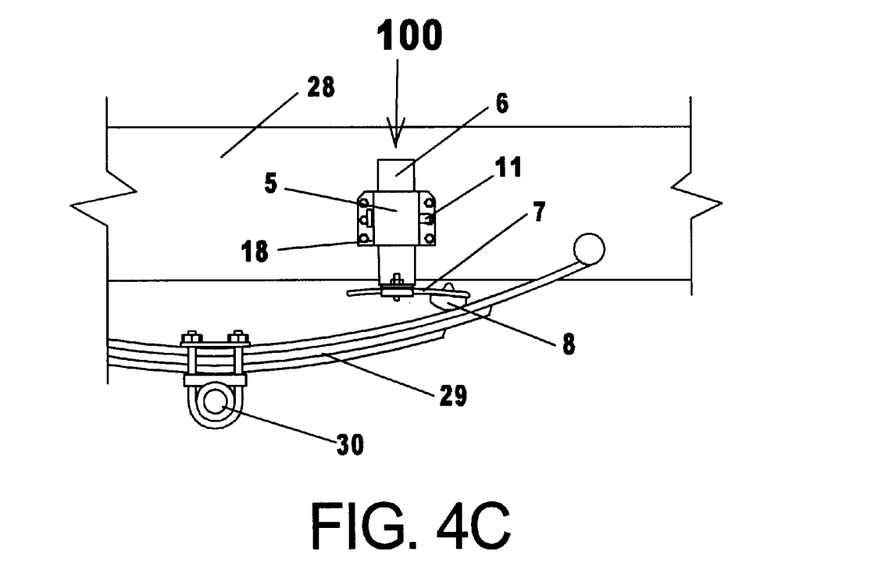

FIG. 4c shows an installed configuration wherein mounting frame (18) is attached to chassis member (28) of host vehicle, hitch pin (11) is placed through holes (24/24') in adjustable column member (6) and holes (27/27') in fixed column member (5), adjustable leaf (7) is fixed in a position substantially halfway between fully extended and fully withdrawn, and abutment pad (8) is in fining contact with the leaf spring assembly (29) of host vehicle. This configuration will provide more suspension augmentation than FIG. 4b but will provide less dampening of shock loads as only approximately half of adjustable leaf (7) is allowed to flex.

Figure 4D:
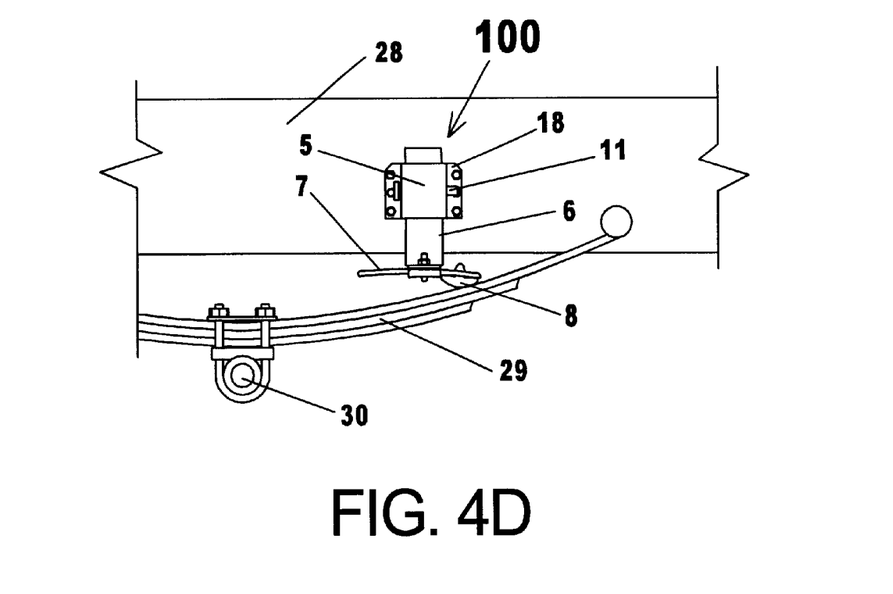

FIG. 4d shows an installed configuration wherein mounting frame (18) is attached to chassis member (28) of host vehicle, hitch pin (11) is placed. through holes (25/25') in adjustable column member (6) and holes (27/27') in fixed column member (5), adjustable leaf (7) is fully withdrawn, and abutment pad (8) is in firm contact with leaf spring assembly (29). This configuration will provide maximum suspension augmentation with minimal dampening of shock loads. Regardless of the specific adjustment settings, ie., vertical position of adjustable column member (6) and horizontal position of adjustable leaf (7), the overall adjustments should be made and the apparatus positioned prior to any supplemental load being placed on the host vehicle. It may be advisable in certain situations to raise the rear of the host vehicle via bumperjack or other means thereby removing all loading prior to adjusting the apparatus to allow easier access to and adjustment of subject apparatus.

Figure 5:
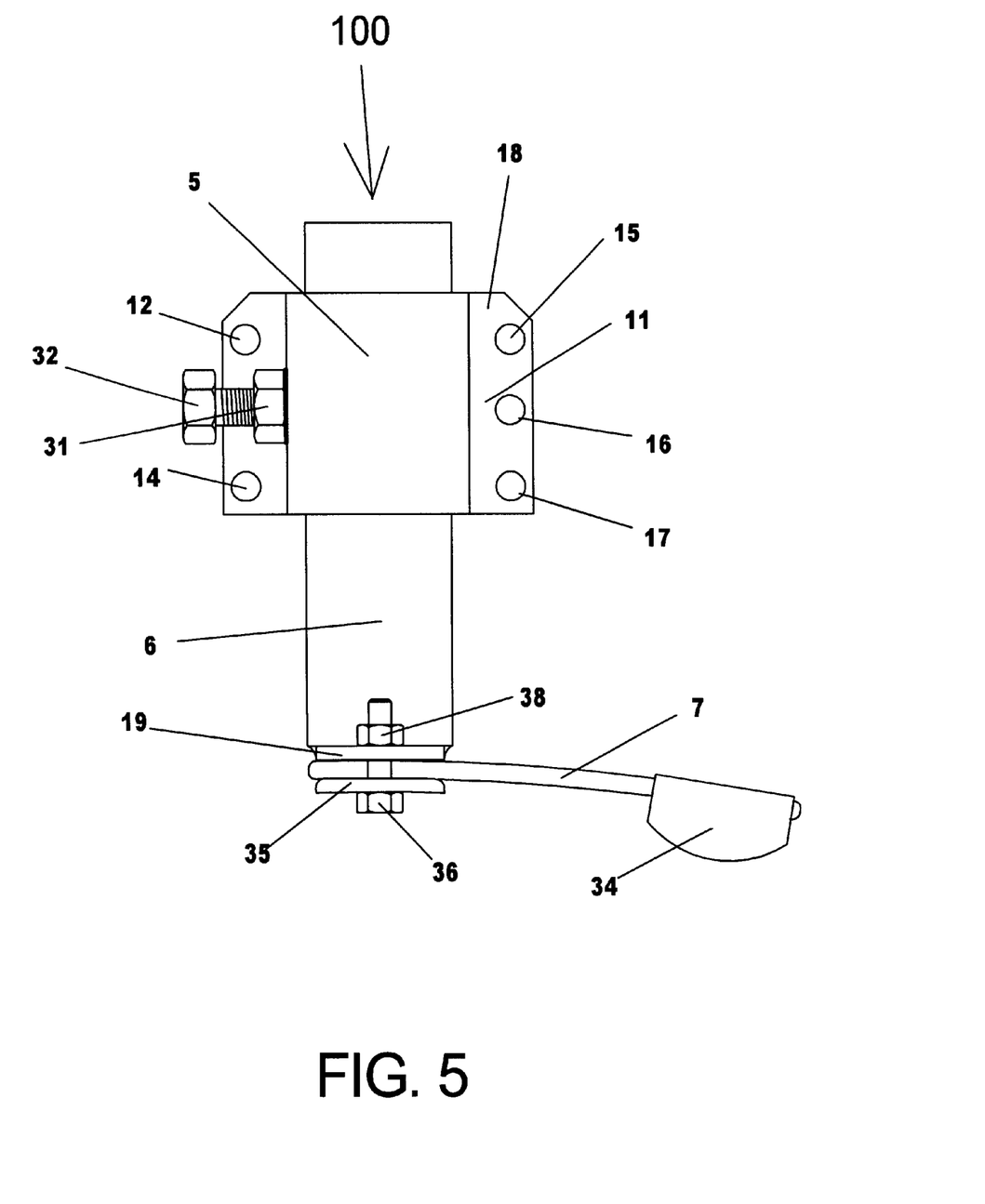
FIG. 5 shows a side view of an alternative embodiment of the leaf spring overload support apparatus.

FIG. 5 shows a side view of an alternative embodiment of subject apparatus. Tightening nut (31) is located concentric to a hole placed through fixed column member (5) and rigidly attached by a continuous perimeter weld thereon. Alternative attachment means may be used. Tightening bolt (32) is shown adjustably disposed through tightening nut (31) so that the end of tightening bolt (32) extends into the interior of fixed column member (5) upon clockwise rotation.

FIG. 5 further shows an alternative abutment pad (34) embodiment wherein a molded pad fixed about adjustable leaf (7) is used. This embodiment prevents any holes placed through adjustable leaf (7), thus potentially compromising the structural strength thereof.

FIG. 5 also shows an alternative embodiment of the horizontal adjustment means of adjustable leaf (7) that includes alternative flat lower plate (35) held in place by bolts (36) and (37 not shown) and corresponding nuts (38) and (39 not shown).

Figure 6:
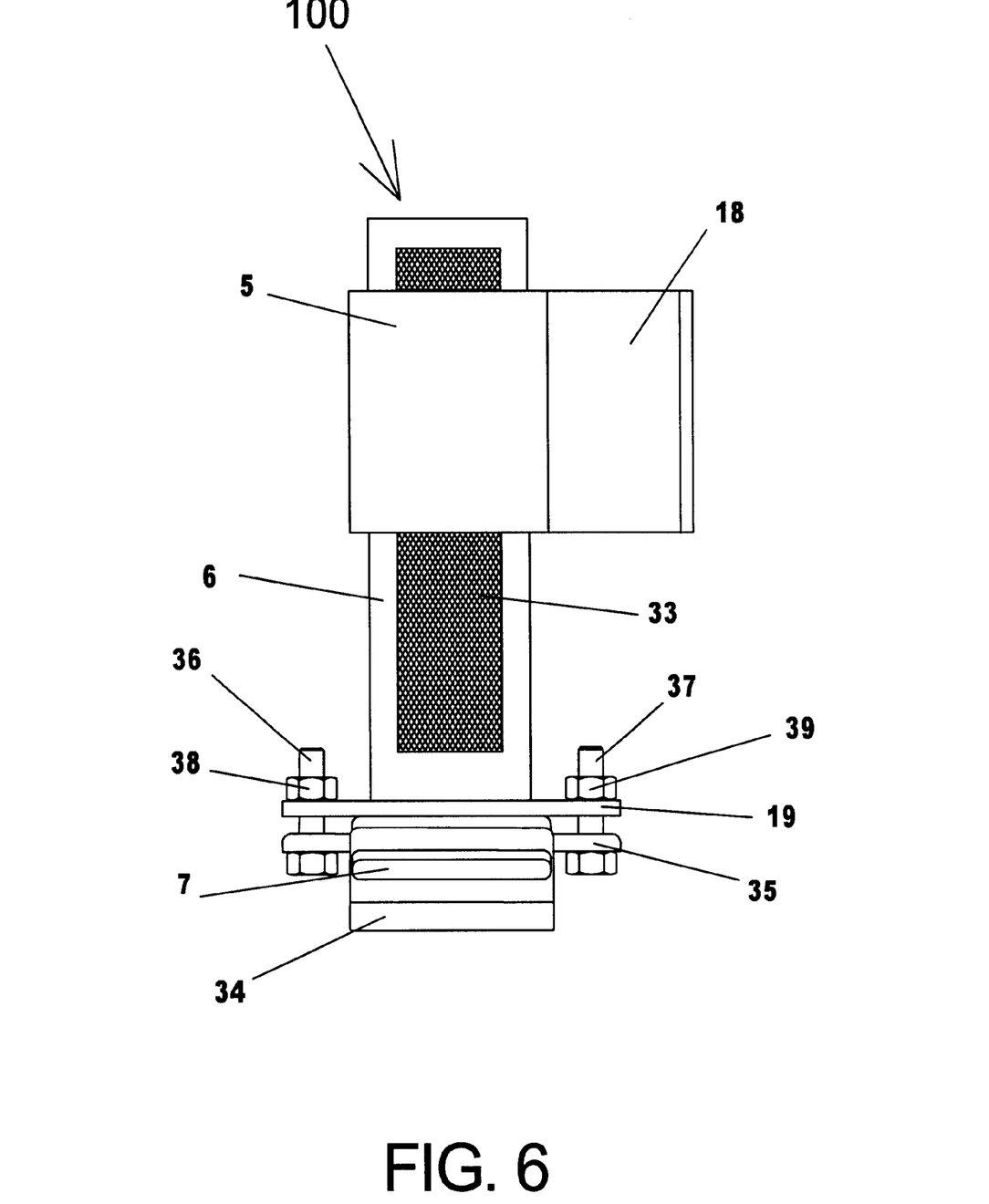
FIG. 6 shows a rear view of the alternative embodiment.

FIG. 6 is a rear view of the alternative embodiment illustrated in FIG. 5. FIG. 6 shows knurled area (33) on the rear surface of adjustable column member (6). The purpose of knurled area (33) is to insure a secure grip/connection between fixed column member (5) and adjustable column member (6) upon tightening of tightening bolt (32 not shown), thus eliminating the possibility of vertical slippage there through.

FIG. 6 provides an illustration of bolts (36,37) placed through flat lower plate (35) and upper plate (19) and held in place by nuts (38,39) respectively.

FIG. 6 also illustrates that in the alternative embodiment adjustable column member (6) contains no holes, nor does the rear surface of fixed column member (5).

Figure 7:
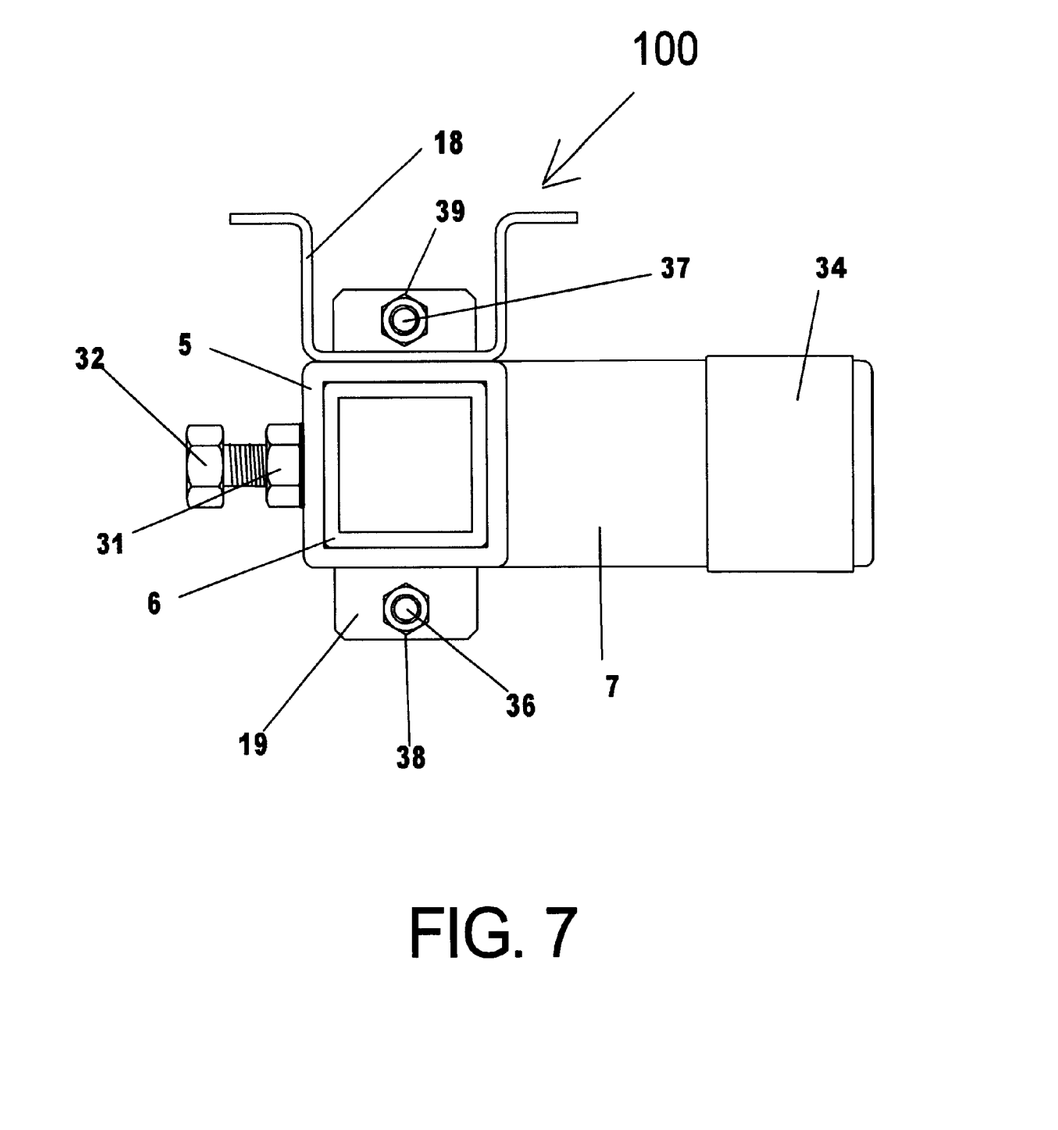
FIG. 7 shows a top view of the alternative embodiment.

FIG. 7 is a top view of the alternative embodiment described above showing tightening nut (31) attached to the front surface of fixed column member (5) and tightening bolt (32) disposed there through. FIG. 7 further shows abutment pad (34) molded over the top of adjustable leaf (7).

Figure 8:
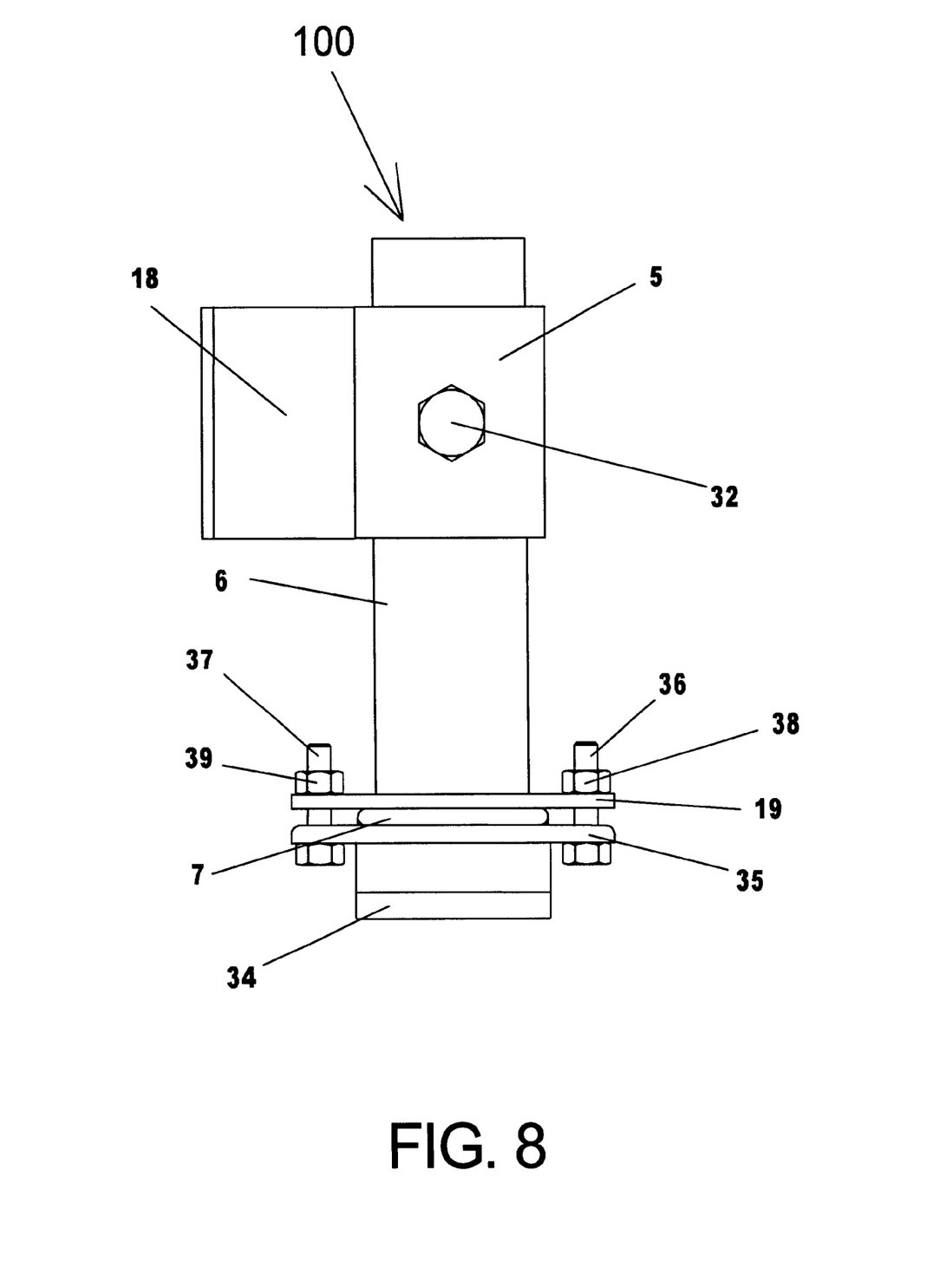
FIG. 8 shows a front view including an alternative embodiment.

Continuing an illustration of the alternative embodiment, FIG. 8 shows a front view thereof. Most notably, FIG. 8 further illustrates that, in the alternative embodiment, adjustable column member (6) contains no lateral holes and the front surface of fixed column member (5) contains only one hole that disposed concentric to the axis of tightening bolt (32).

Figure 9:
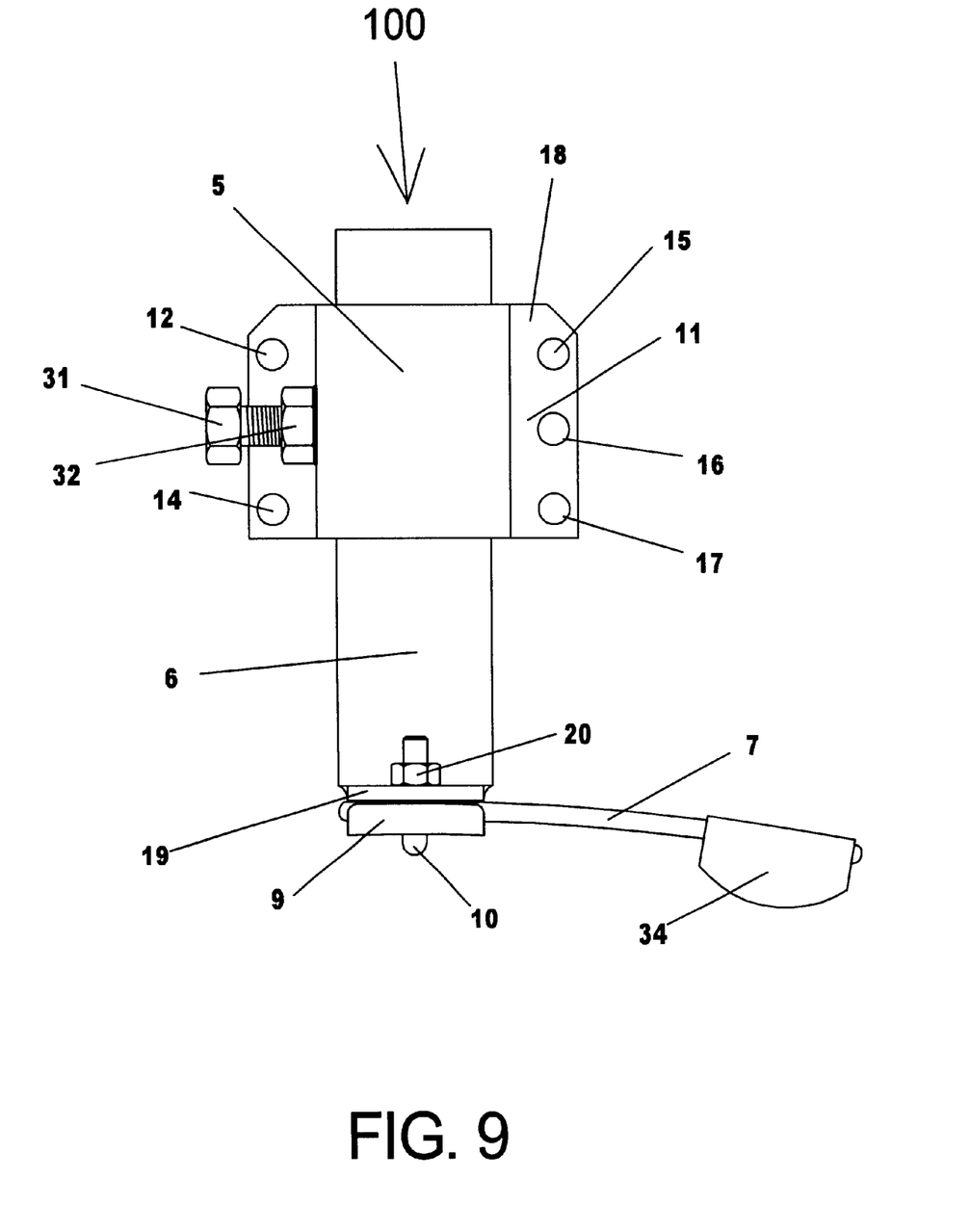
FIG. 9 shows a side view of a second alternative embodiment.

It should be further stated that features of the preferred and alternative embodiments are largely interchangeable. For example, as illustrated by FIG. 9, adjustable leaf spring (7) fitted with alternative abutment pad (34) could well be held in place by lower plate (9), U-bolt (10) and associated nuts (20,21). This configuration might further include alternative tightening bolt (31) and associated tightening nut (32) in lieu of the hitch pin configuration illustrated in FIGS. 1–4.

While the invention has been set forth in this disclosure with respect to the preferred embodiment, and in some cases optional embodiments have been set forth, it will be appreciated by those skilled in the art that there are many ways to implement the structural design of subject implement frame system without departing from the spirit and scope of the invention and disclosure herein. A specific example being the installation of two overload support apparatus on each side of a host vehicle (four in all), one in front of the axle housing and one behind.

The embodiments shown and described above are exemplary. Many details are found in the art, therefore, many such details are neither shown nor described. Even though numerous characteristics and advantages of the present invention have been shown in the drawings and accompanying text, the description is illustrative only, and changes may be made in the detail, especially in matters of size, shape and arrangement of parts within the principles of the invention to the full extent indicated by the broadest possible meaning of the terms of the attached claims. Further, not all details and features of the invention as disclosed must be adopted to realize the invention. The limits of the inventions and bounds of the patent protection are measured by and defined in the following claims.

What is claimed is:

1. Apparatus for augmenting the load carrying capacity of a vehicle suspension system that includes a chassis assembly and one or more pairs of leaf spring assemblies with axle housings attached thereto comprising:

a mounting frame, said mounting frame suitable for attachment to a chassis member of a host vehicle;

vertical support member having an upper and lower end, said vertical support member adjustably attached to said mounting frame so as to allow adjustment in a substantially vertical direction therewith;

a spring member having a fore and aft end and an upper and lower surface, said spring member capable of elastic deformation when exposed to opposed non-coaxial substantially vertical forces;

attachment means between lower end of said vertical support member and said spring member to provide adjustment in a substantially horizontal direction between said spring member and lower end of said vertical support member;

an abutment member rigidly attached to lower surface of said spring member near the aft end and positioned to allow contact with leaf spring assembly of said host vehicle at a location aft of said axle housing.

2. Apparatus of claim 1, wherein said mounting frame includes a substantially vertical channel for slidably accepting said vertical support member there through.

3. Apparatus of claim 2, wherein said vertical support member is slidably disposed within vertical channel of said mounting frame and adjustably fixed therein.

4. Apparatus of claim 3 wherein vertical channel of said mounting frame contains a pair of opposed equally sized holes and said vertical member contains a plurality of pairs of opposed equally sized holes, said opposed holes in vertical channel of said mounting frame can be made to concentrically align with each pair of opposed holes in vertical member upon vertical movement of vertical member so as to accept a pin member inserted there through.

5. Apparatus of claim 3 wherein vertical channel of said mounting frame contains at least one bolt tightening assembly, said bolt tightening assembly further comprising:

a substantially horizontal hole, a threaded tightening nut rigidly attached to said mounting frame concentric with said hole, said tightening nut sized to match said hole, and a threaded tightening bolt disposed through said hole and said threaded tightening nut so as to rigidly contact vertical support member upon rotation.

6. Apparatus of claim 5 wherein said vertical support member includes at least one textured surface so as to provide an increased friction coefficient between said vertical support member and vertical channel of said mounting frame.

7. Apparatus of claim 1 wherein said attachment means further comprises an upper plate, said upper plate rigidly attached to lower end of said vertical member, a lower plate, said lower plate oriented substantially parallel to said upper plate with said spring member situated between said upper and lower plates, and a tightening means to adjustably attach said upper plate, said spring member and said lower plate in a relative fixed position.

8. Apparatus of claim 7 wherein said tightening means further comprises a u-bolt assembly, said u-bolt assembly placed through two holes is said upper plate and around said spring member and said lower plate with tightening nuts positioned above said upper plate.

9. Apparatus of claim 7 wherein said tightening means further comprises two bolts, concentric holes in said upper and lower plates, said holes positioned substantially lateral and on opposite sides of spring member held between said upper and lower plates, said bolts inserted through said concentric holes, and two nuts, said nuts rotatably attached to said bolts to provide tightening thereon.

10. Apparatus of claim 9 wherein said vertical member contains at least four opposed pairs of holes.

11. Apparatus of claim 10 wherein said mounting frame contains holes for accepting bolts there through for rigid attachment to said vehicle chassis.

* * * * *